Patented June 22, 1948

2,443,735

UNITED STATES PATENT OFFICE 2,443,735

EMULSION COPOLYMERIZATION OF UN-SATURATED ALKYD RESINS

Edward L. Kropa, Old Greenwich, Conn., assignor to American Cyanamid Company, New York, N. Y., a corporation of Maine No Drawing. Application June 12, 1943, Serial No. 490,643

4 Claims. (Cl. 260—45.4)

This invention relates to resinous materials which are reaction products of a reactive resin of the alkyd type with substances which contain the polymerizably reactive $CH_2=C<$ group particularly the vinyl compounds or the alpha-methyl substituted vinyl compounds and the invention also relates to the preparation of such resinous materials.

This invention is a continuation-in-part of my copending application Serial No. 265,543, filed April 1, 1939, and entitled "Emulsions of polymerizable compositions and processes of producing and polymerizing the same," as well as of my copending application Serial No. 487,034, filed May 14, 1943, and entitled "Polymers and methods of producing same."

One of the objects of this invention is to prepare vinyl resins, particularly from vinyl hydrocarbons, which possess high softening points.

Another object of this invention is to prepare vinyl polymers which are substantially insoluble.

Still another object of this invention is to prepare polymers in emulsions in such a manner as to produce a resin suitable for molding, that is, in small particles.

A further object of this invention is to utilize dispersing agents which react with and chemically combine with the material undergoing polymerization in emulsion.

Still another object of this invention is to provide agents which will act as dispersing agents for and be compatible with polymerizable unsaturated compounds.

These and other objects are attained by preparing and polymerizing an emulsion or dispersion of a potentially polymerizable mixture including a resin possessing a plurality of polymerizably reactive alpha, beta enal groups, i. e.,

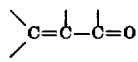

and at least one organic substance which contains the polymerizably reactive group $CH_2=C<$.

The materials containing the $CH_2=C<$ group which I employ in the practice of this invention are those which contain a single ethylenic linkage and for the sake of brevity such materials may be referred to herein as "reactive materials" or as "reactive materials containing the $CH_2=C<$ group" and they are thus to be distinguished from the resins which possess a plurality of polymerizably reactive alpha, beta enal groups and which are designated as "reactive resins" or as "unsaturated alkyd resins."

Many of the reactive materials containing the $CH_2=C<$ group are solvents and therefore the reactive resins may be dissolved therein to form liquid compositions which may be used as such without the addition of any other solvent unless particularly desirable. It is to be understood, however, that I am not restricted to substances which actually act as solvents since in some cases the organic substances containing this reactive group may, in fact, act as a solute rather than as a solvent, it being dissolved by the resin, or a colloidal solution may be produced instead of a true solution. Furthermore, either one or all of the reactive materials may be resins containing a plurality of $CH_2=C<$ groups. Such materials or mixtures of such materials could be cured by a reactive resin or by a reactive substance which contains polymerizably reactive alpha, beta enal groups. Such substances may be derived from alpha, beta unsaturated organic acids, for example, by the esterification of such acids.

Among the reactive resins used in the practice of this invention for interaction with the reactive material containing the $CH_2=C<$ group are those which are derived from alpha, beta unsaturated organic acids and which contain polymerizably reactive groups. The term "acids" as used herein is intended to include the anhydrides as well as the acids themselves since the former may frequently be used more conveniently, e. g., maleic anhydride may be used instead of the acid. The term alpha, beta unsaturated organic acid as used in the art does not include acids wherein the unsaturated group is part of an aromatic-acting radical as, for example, phthalic acid, and the same definition is adopted herein.

The reactive resins are preferably produced by the esterification of an alpha, beta unsaturated polycarboxylic acid with a polyhydric alcohol, and particularly a glycol. Although esterification of the acid with a polyhydric alcohol is perhaps one of the simplest, most convenient ways of obtaining a reactive resin, I am not precluded from using resins otherwise derived from alpha, beta unsaturated organic acids. Reactive resins suitable for my invention are any of those containing a plurality of polymerizably reactive alpha, beta enal groups.

Preparation of the emulsion

Emulsions of reactive mixtures such as those described herein are produced by agitation of the reactive mixture with water and with or without added emulsifier.

Some of these reactive mixtures are inherently emulsifiable since the resin alone or in conjunction with the reactive material may be active as an emulsifier or dispersing agent. Examples of such resins are those derived from polyethylene glycols (e. g., hexaethylene glycol maleate, heptaethylene glycol maleate, octaethylene glycol maleate, etc.), from 2,2-dimethyl propanediol-1,3, from 1,3 butylene glycol and from many other glycols. It may also be desirable to employ mixtures of the glycols such as mixtures of polyethylene glycols. Generally a higher polyethylene glycol gives more stable emulsions than the lower members of the series. Furthermore, if the reactive resin in the reactive mixture is composed of a resin which does not act as an emulsifier then an added emulsifier may be necessary to produce an emulsion sufficiently stable for most purposes. Obviously, a small portion of a reactive resin which will act as an emulsifier, e. g., the polyethylene glycol resins, may be used as an emulsifier for a reactive mixture containing some unsaturated alkyd resin which does not itself act as an emulsifier. The advantage of employing only emulsifiers which are unsaturated alkyd resins is that they will react with the vinyl compound to produce a polymer, and therefore there will be no free emulsifier present which must, in many cases, be removed by washing or by some other chemical or physical treatment.

Reactive resins which will act as emulsifiers may also be prepared in accordance with my invention from the short-chain glycols such as ethylene glycol but, if this be done, the resin should be modified with a long-chain polycarboxylic acid, e. g., adipic acid, sebacic acid, etc.

Other compatible emulsifiers which may be used in addition to the unsaturated alkyd resins may be selected from the following types: Diamyl, dihexyl or dioctyl sulfosuccinic esters and salts thereof, salts of alkylated naphthalene sulfonic acids, long chain quaternary ammonium compounds, sulfonated or sulfated higher alcohols, e. g., lauryl sulfate, the salts of the sulfated or sulfonated higher alcohols, sulfonated oils, glycol oleates and linoleates, mineral oil sulfonates, aromatic sulfonates, wax acid soaps, triethanolamine soaps such as the oleate, monoglycerol linoleates, amino sulfonates and sulfates, ammoniacal or other alkaline caseins, soaps, lecithin, cholesterol, saponin, emulsifying gums such as gum arabic, gelatine, etc.

Obviously various mixtures of these emulsifiers and/or wetting agents may be employed in order to obtain suitable stability of the emulsions for the particular purpose for which the composition is to be put. For some purposes a quick breaking emulsion will be more desirable, while for other purposes a relatively stable emulsion will be required. By judiciously selecting the emulsifier or combination of emulsifiers and the concentration thereof, an emulsion may be produced with suitable characteristics for any particular use.

In conjunction with the emulsifiers certain stabilizers or other surface tension modifiers may be used. Examples of these are the relatively low molecular weight polar compounds, e. g., the amines, alcohols, ketones, etc. Specific examples of these are cyclohexanol, benzyl alcohol, etc. Other substances such as pine oil may be employed similarly.

The emulsions which are produced according to my invention may have the water either in the dispersed phase or in the continuous phase. Generally, however, I prefer to have emulsions wherein the water is in the continuous phase. This will vary according to the particular mixture employed, the proportions employed and according to the presence or absence of emulsifiers other than the unsaturated alkyd resins.

The following examples in which the proportions are in parts by weight are given by way of illustration and not in limitation.

Example 1

A mixture containing 50 parts of vinyl acetate and 50 parts of polyethylene glycol maleate resin (a mixture containing hexaethylene glycol as the major constituent with minor amounts of other polyethylene glycols is used in making this resin) is shaken or mixed with a high speed stirrer with 100 parts of water. To the resulting emulsion 0.05 part of cobalt chloride are added together with 10 parts of an autodispersible green dye. Such an emulsion will cure in a short time at 90° C. if printed on cloth, etc., and withstands soap and water washing, and pressing.

Example 2

Emulsions are produced by agitating mixtures containing styrene and polyethylene glycol maleate resins with an equal weight of water. About 0.4% benzoyl peroxide is added to the reactive mixture before emulsification. Upon subjecting such emulsions to polymerization conditions such as heating at 45–90° C. the reactive mixture gels to form hard resins.

Example 3

2 parts of a butylene glycol maleate resin (resin A) is dissolved in 200 parts of monomeric styrene. 0.2 part of benzoyl peroxide is added to the resulting solution and the latter is then mixed with about 400 parts of water and agitated in any convenient manner as, for example, by means of a mechanical stirrer. The emulsion is obtained after a very short time.

The emulsion prepared in the foregoing manner is heated by means of steam, for example, in a reaction vessel having a steam jacket, and with continuous agitation for about 6 hours. During this time the emulsion breaks and small particles of resin polymer are formed. Toward the end of the heating period the particles of polymer tend to agglomerate into a lump. The polymer is broken up if necessary and dried to form a material suitable for compression molding.

Compression moldings which are glass clear are readily obtainable from this material. The polymer has a Peake's flow value of 131° C. which is approximately 3 degrees higher than that of polystyrene. As is well-known in this art, the Peake's flow value is the temperature at which a material flows one inch within 2 minutes.

Example 4

A composition similar to that prepared in accordance with Example 3 is produced by blending 200 parts of styrene with 4 parts of butylene glycol maleate resin (resin A) and 0.2 part of benzoyl peroxide. The resulting solution is emulsified and subjected to polymerization conditions in the same manner described in Example 3. The polymer is obtained in the form of small particles. This polymer produced clear moldings when subjected to a pressure of 3,000 pounds per square inch at a temperature of 150° C. the Peake's flow value is about 167° C. for this composition.

*Example 5*

A polymer is prepared in accordance with Example 1 except that the proportion of butylene glycol maleate resin is increased to 10 parts. The polymer is obtained in the form of small particles, e. g., about 0.5–5 mm. Compression moldings of this polymer are slightly opaque and the Peake's flow value is so high that it cannot be determined.

*Example 6*

| | Parts |
|---|---|
| Monomeric Styrene | 665 |
| Ethylene glycol fumarate modified with sebacic acid (resin B) | 30 |
| Benzoyl peroxide | 1.4 |
| Water | 2,800 |

The resin is dissolved in the styrene and the benzoyl peroxide is dissolved in the resulting solution. The water is added to the vinyl solution and the mixture agitated until a creamy emulsion is obtained. The emulsion may be homogenized if desired and it is then placed in a reaction vessel, stirred and heated at reflux (about 90° C.) for about 24 hours. During the first 6 hours the emulsion is fairly stable but on further heating it slowly breaks and fine particles of resin form. At the end of 24 hours the polymeric resin particles are quite hard. Water is decanted from the resin which is in the form of small granules. The polymer is dried by covering with methanol and heating for a short period of time. The polymer is then vacuum dried and the resulting resin is suitable for molding. Clear moldings are obtained under a pressure of 3,000 pounds per square inch at the temperature of 150° C.

Moldings have the following properties:

| | |
|---|---|
| Dielectric constant (at 60 cycles) | 2.9 |
| Power factor (at 60 cycles) | 0.001 |
| Dynstat bending kgs./cm.² | 823 |
| Bending angle degrees | 12.9 |
| Dynstat impact cm. kgs./cm.² | 7.5 |
| Izod impact ft. lbs./in | 0.36 |
| Flexural strength lbs./sq. in | 6,140 |

The Peake's flow value is about 151° C.

Five parts of the above polymer was suspended in 100 parts of toluene. Within 24 hours each particle has swollen to about 5 times its normal size. The material did not enter into solution.

*Example 7*

| | Parts |
|---|---|
| Hydrogenated dimeric isopropenyl toluene | 45 |
| Resin D | 20 |
| Styrene | 385 |
| Benzoyl peroxide | 0.8 |
| Water | 1,800 |

A solution of the hydrogenated dimer, the resin, the styrene and the benzoyl peroxide is mixed with the water, agitated to form an emulsion and the emulsion homogenized. The resulting emulsion is heated with agitation in accordance with the procedure of Example 6. During the first half hour the mass becomes somewhat pasty and then disperses into small particles. At the end of 24 hours less than about 1 part of styrene remains unreacted. The resin polymer is dried and moldings thereof are more flexile than those produced from the product of Example 6.

*Example 8*

| | Parts |
|---|---|
| p-Methyl styrene | 110 |
| Resin B | 5.5 |
| Benzoyl peroxide | 0.2 |
| Water | 440 |

These substances are emulsified in the manner described in Example 7 and subjected to polymerization conditions by heating at reflux in a steam jacketed reaction vessel for about 24 hours. After drying the product forms clear moldings.

*Example 9*

| | Parts |
|---|---|
| Benzoyl peroxide | 0.8 |
| Water | 1,400 |
| Hexaethylene glycol fumarate (resin C) | 17.5 |
| Styrene | 332.5 |

The resin is dissolved in the styrene and the benzoyl peroxide catalyst is added. The solution is mixed with water and agitated rapidly to form an emulsion. The emulsion is homogenized and then heated with rapid stirring at reflux in a steam jacketed vessel for about 24 hours. A solid granular polymer results and clear moldings may be obtained therefrom.

The polymers of Examples 3–9 may be treated with organic liquids such as toluene, benzene, carbon tetrachloride, etc. for from a few minutes to several hours thereby causing the particles to swell. If the swollen resin be decanted and the solvent removed, as by steaming, the resin returns to its original shape. In some instances improved products are obtained by this treatment.

As indicated by the foregoing examples, my invention is directed broadly to the conception of emulsifying any compatible system including an unsaturated alkyd resin and a polymerizably reactive material containing the $CH_2=C<$ group and subsequently polymerizing the polymerizable mixture while in the emulsion. Any compatible system of the type mentioned will act as an emulsifier without any added emulsifying agent. For some purposes it may be desirable to add an emulsifying agent other than the reactive mixture in order to produce stable emulsions. It is to be noted that during the polymerization of the reactive mixture the emulsifier is continuously being used up inasmuch as it combines to form a resinous polymer. Accordingly, if no emulsifying agent other than the reactive mixture be present the emulsion will break before the time at which the reactive mixture is completely polymerized.

The stable emulsions produced in accordance with my invention may be used for a wide variety of purposes where it is desirable to obtain small quantities of a convertible resin either in thin films or as an impregnating agent for fibrous materials such as paper, fabrics, leather, etc. Such emulsions preferably have a high concentration of the polymerizable mixture in the water. Illustrations of this type of emulsion are set forth in Examples 1 and 2 although the concentration of the polymerizable mixture may be as much as 60% or more. Upon the application of the emulsion to fabrics or other fibrous materials and upon subjection to heat or other polymerizing conditions, the reactive mixture polymerizes, the emulsion breaks and the water evaporates. The resins thus produced are substantially insoluble and in those cases where the ratio of reactive materials containing the $CH_2=C<$ group to unsaturated alkyd resin is greater than about 1:10, substantially infusible resins are formed.

Specifically, my invention is directed to the preparation of polymeric materials especially adapted for use in molding. Of particular importance is the production of materials which have a high softening point as compared to known materials having similar physical and chemical properties and which are substantially insoluble. By substantially insoluble I mean that the substances do not dissolve in water, acetone, toluene and other ordinary organic liquids. If a polymer in the form of granules or small particles be desired, an emulsion of a reactive mixture of the type described herein is polymerized in accordance with the general procedure set forth in Examples 3 et seq. During the polymerization the emulsion breaks and small particles, i. e., from about 0.5 mm. to about 5 mm. in diameter, of polymer precipitate. These emulsions preferably contain a small proportion of the reactive mixture as compared to the water and generally I prefer not to stabilize them by the addition of any emulsifying agent other than the reactive mixture of unsaturated alkyd resin and a compatible polymerizably reactive substance containing the $CH_2=C<$ group.

If a stable emulsion is produced by employing a suitable emulsifier in addition to the polymerizably reactive unsaturated alkyd resin admixed with a compatible polymerizably reactive material containing the $CH_2=C<$ group, latices of the polymer will be obtained upon molymerization. Such latices may be used in coatings or in impregnating baths or they may be precipitated or coagulated to produce powdery or gummy resinous products.

It will be clear from the foregoing disclosure that I may produce polymers, which are substantially insoluble and in the form of small particles suitable for molding, by the emulsion polymerization of about 1-10% or more of an unsaturated alkyd resin having polymerizably reactive alpha, beta-enal groups blended with a compatible, polymerizably reactive substance containing the $CH_2=C<$ group. This aspect of my invention is especially important in connection with the production of high softening polymers similar to those obtained by polymerizing styrene or other vinyl substituted aromatic hydrocarbons. By employing a small amount of an unsaturated alkyd resin admixed with a vinyl benzene, polymers are obtained having substantially as good or better electrical and other physical properties as similar polymers not containing the unsaturated alkyd resin. On the other hand my products have a substantially higher softening point than the corresponding polymer of the vinyl benzene which does not have any unsaturated alkyd resin copolymerized therewith. The higher softening point is often necessary or desirable in those applications where the other properties of the polymers of the vinyl hydrocarbons be suitable. For this purpose I generally employ a reactive mixture containing an unsaturated alkyd resin and a reactive material containing a $CH_2=C<$ group in a ratio not greater than about 1:20.

For the production of molding compositions of styrene and its homologs which are modified with an unsaturated alkyd resin in order to increase the softening point thereof, I prefer to employ emulsions containing between about 5% and about 40% of the polymerizably reactive mixture, the balance being essentially water.

High-softening, substantially insoluble polymers of reactive materials containing the $CH_2=C<$ group may be prepared by bulk polymerization in the form of sheets, rods, tubes, blocks, etc. by copolymerization with about 1-10% of an unsaturated alkyd resin.

By judiciously selecting a reactive resin and a reactive material containing the $CH_2=C<$ group, a polymer thereof may be obtained which will be particularly suited for the purpose to which the resin emulsion is to be put.

*Preparation of the polymerizable mixture*

A reactive resin such as those prepared by the esterification of an alpha, beta-unsaturated organic acid and a glycol or other polyhydric alcohol as illustrated above is mixed with a reactive material containing the group $CH_2=C<$. Upon the addition of a polymerization catalyst and subjection of the mixture to polymerization conditions such as, for example, heat, light or a combination of both, a substantially insoluble resin is obtained.

All of the reactive substances suitable for use according to my invention for reaction with a reactive resin are characterized by the presence of the reactive group $CH_2=C<$ and none of them contain conjugated carbon to carbon double bonds. Compounds containing a conjugated system of carbon to carbon double bonds are known to react with themselves or with other unsaturated compounds such as the maleic esters by a 1,2-1,4 addition mechanism such as that which has become generally known as the Diels-Alder reaction. On the other hand, compounds such as those used according to the present invention and which contain no conjugated carbon to carbon double bonds obviously cannot undergo this type of reaction with the maleic esters. Accordingly, my invention is not directed to the use of unsaturated compounds containing conjugated systems of carbon to carbon double bonds. Many substances which contain a carbon to carbon double bond conjugated with respect to oxygen are suitable for use according to my invention since they do not react with unsaturated resins in an undesirable manner but, instead, copolymerize or interpolymerize to form substantially infusible, substantially insoluble resins. The substances having a $CH_2=C<$ group which are suitable are those which do not have a boiling point below about 60° C.

Some examples of the reactive materials containing the $CH_2=C<$ group are: the vinyl hydrocarbons such as styrene, o-, m-, p-methyl styrene, alpha methyl styrene, 2,4-dimethyl styrene, 2,3-dimethyl styrene, 2,5-dimethyl styrene, isopropenyl toluene, vinyl naphthalene, etc. Mixtures of any of the foregoing and/or succeeding reactive materials may be employed, e. g., isopropenyl toluene and acrylonitrile. The vinyl aromatic hydrocarbons are especially suitable for the production of plastic materials having high softening points. Thus, I provide by my invention materials having the desirable properties of polystyrene and polymers of other vinyl aromatic hydrocarbons but having the high softening point which is often required in those technical applications where the good properties of polystyrene would be desirable, as, for example, in the manufacture of electrical insulators.

Other reactive materials which may be employed are the methyl, ethyl, propyl, butyl, cyclohexyl, cetyl and other alkyd esters of acrylic and methacrylic acids. Aliphatic vinyl esters may also be used including vinyl acetate, vinyl butyrate, vinyl laurate, vinyl stearate, acrolein, methacrolein, acrylonitrile and methacrylonitrile, vinyl ether, etc. Water soluble curing agents such as acrylamide and methacrylamide may also be used as such or in admixture. In many instances it will be advantageous to use mixtures of the reactive solvents. In this way the speed of the reaction may be controlled somewhat, the compatibility of some of the resins improved and in some instances products having improved physical and chemical properties are obtained. Examples of other reactive materials containing the $CH_2=C<$ group which may be used alone or in admixture with another material containing the $CH_2=C<$ group are listed in my copending application Serial No. 487,034, filed May 14, 1943, and they include the allyl compounds, e. g., diallyl maleate, diallyl fumarate, diallyl phthalate and diallyl succinate. Other allyl compounds, e. g., allyl alcohol and methallyl alcohol react only very slowly and are, therefore, limited in their use. The diallyl esters, being both quite active and high boiling are especially important from the commercial point of view. Triallyl esters may also be used, e. g., triallyl tricarballylate. Furthermore, allyl esters of inorganic esters may be used, e. g., triallyl phosphate.

Any of the foregoing compounds containing the $CH_2=C<$ group may be substituted with hydrocarbon groups such as methyl, inorganic groups such as chlorine or other groups such as the —CN group.

The polymerization catalysts include the organic superoxides, aldehydic and acidic peroxides. Among the preferred catalysts for incorporation into the reactive mixtures there are: the acidic peroxides, e. g., benzoyl peroxide, phthalic peroxide, succinic peroxide and benzoylacetic peroxide, fatty oil acid peroxides, e. g., coconut oil acid peroxides, stearic peroxide, lauroyl peroxide and oleic peroxide; alcohol peroxides, e. g., tertiary butyl peroxide and terpene oxides, e. g., ascaridole. Still other polymerization catalysts might be used in some instances, namely cobalt salts (particularly the linoleate and naphthenate), p-toluene sulfonic acid, etc. If desirable, the polymerization catalyst may be added to the aqueous emulsion of the reactive mixture and if the continuous phase be water then a water soluble catalyst should preferably be used, e. g., hydrogen peroxide, water soluble cobalt salts, etc.

The concentration of catalyst employed is usually small, i. e., for the preferred catalyst, from about 1 to 20 parts of catalyst per 1000 parts of the reactive mixture. If an inhibitor be present, up to 5% or even more of the catalyst may be necessary according to the concentration of inhibitor.

The term "polymerization catalyst" as used in this specification is not intended to cover oxygen contained in the resin as an impurity. While this small amount of oxygen would only catalyze to a very small extent, in order to eliminate any ambiguity the term "polymerization catalyst" is specifically defined as excluding any oxygen present as an impurity in the resin itself.

The polymerization conditions referred to are heat, light or a combination of both. Ultraviolet light is more effective than ordinary light. The temperature of conversion depends somewhat on the boiling point of the reactive material containing the $CH_2=C<$ group and also on the pressures used. At atmospheric pressure as generally used in coating or impregnating operations temperatures near or above the boiling point are unsuitable in most instances since substantial amounts of the reactive material containing the $CH_2=C<$ group which acts as the solvent would be lost by evaporation before the reaction between the resin and reactive material can be completed. Accordingly a temperature between room temperature (about 20–25° C.) and the boiling point is usually employed where polymerization of this nature is carried out. The rate of polymerization doubles for about each 10° (C.) rise in temperature. For this reaction a temperature is selected which will give a suitable reaction rate and yet not cause substantial volatilization of the reactive material. The following table shows the approximate polymerization temperatures most suitable for the named reactive materials when polymerized at atmospheric pressure and without a special procedure.

| Reactive Material | Temperature Range | Preferred Temperature |
|---|---|---|
|  |  | °C. |
| Vinyl acetate | Room temp. to about 50° C. | 37 |
| Styrene | 55° to about 120° C. | 80 |
| Methyl methacrylate | 40° to about 65° C. | 58 |
| Diallyl maleate | Room temp. to about 110° C. | 50–90 |
| Diallyl phthalate | Room temp. to about 150° C. | 50–90 |

If an emulsion is to be polymerized in order to produce polymer in small particles, the polymerization may be carried out by heating the emulsion under reflux. In this way the polymerization speed is higher than that which would be obtained at a lower temperature and yet no loss of the volatile component of the polymerizably reactive mixture is encountered. Similarly, the polymerization may be carried out at even higher temperatures by the use of pressure either alone or in conjunction with a reflux condenser. Generally, I prefer to carry out the copolymerization of my reactive mixture at temperatures varying between about 20° C. and about 150° C.

The particular reactive resin, reactive material containing the $CH_2=C<$ group and catalyst is selected according to the type of product desired, taking into account the solubilities of the reactants as well as the character of the resulting gels. Some combinations of reactive resin and reactive materials result in opaque gels while others give clear products in the gel state. Obviously for many purposes the opaque gel may be equally as useful as the clear gel.

The reaction mixture may be modified in several ways in order to produce a composition suitable for any particular use. If a thinner mixture is desired than is obtained upon the mixing of the reactive resin and reactive material, it is possible in some instances to reduce the viscosity. This may be done by adding an esterification catalyst, e. g., p-toluene sulfonic acid and then heating until the viscosity is suitably reduced.

If a more rapid rate of polymerization of the reactive mixture in the emulsion than that generally obtained be desired or if a thicker reactive mixture be desired than that normally obtained with a mixture of the reactive resin and the reactive material containing the $CH_2=C<$ group, the said mixture may be bodied by heating. This may be done at about 70° C. to about 110° C., preferably at about 90° C. for sufficient length of time to give the desired viscosity. This bodying process may also be used to reduce the induction period for polymerizing the reactive mixture. If this be the case, the bodying process is continued until the viscosity begins to rise rapidly, indicating that the induction period has been substantially reduced. A general rule for determining the heating time is to heat the mixture until the viscosity is about two to three times the initial viscosity.

After the bodying operation is carried out, the polymerization catalyst is added to the mixture. In this connection the use of liquid peroxides is more convenient than the use of solid peroxides since the latter are more difficult to get dissolved rapidly enough. Peroxides of the coconut oil acids, tertiary butyl peroxide and ascaridole are suitable liquids.

By the use of this bodying process the induction period is cut down from approximately ½ to ⅛ of the time when the bodying process is not used. Even greater reductions are obtained with some mixtures.

In some instances it may be desirable to incorporate a polymerization inhibitor in the reactive mixture. This may be done either to permit the reactive mixture to be stored for some period of time or to control the rate of reaction of the mixture on subjection of said mixture to polymerization conditions. When it is desired to use this mixture, a small percentage of polymerization catalyst is added, sufficient to overcome the effect of the inhibitor as well as to promote the polymerization. By careful control of the concentrations of inhibitor and catalyst a uniform product is obtained with a good reaction velocity. Suitable polymerization inhibitors of this reaction are phenolic compounds, especially the polyhydric phenols, and aromatic amines. Specific examples of this group of inhibitors are hydroquinone, benzaldehyde, ascorbic acid and isoascorbic acid, resorcinol, tannin, sym. di-beta naphthyl p-phenylene diamine and phenolic resins. Sulfur compounds are also suitable. The concentration of inhibitor is preferably low and I have found that less than 1% is usually sufficient. However, with the preferred inhibitors I prefer to use only about 0.01% to about 0.1%.

The inhibitor may be incorporated in the reactive resin-reactive material combination (either before or after bodying) or it may be added to the original reactive resin before or during the esterification of the said reactive resin. By adding the inhibitor to the unesterified mixture the inhibitor may become bound into the resins upon subsequent esterification thus permitting the use of an inhibitor which might not be soluble in the finished resin.

If the reactive mixture is to be made into emulsion form at the time of preparation, the polymerization catalyst may be incorporated into the reactive mixture before emulsification if the emulsion is to be used promptly. On the other hand, if the emulsion is to be stored for some time before use, it may be more desirable to add a catalyst soluble in the continuous phase of the emulsion just before polymerizing said emulsion.

If desired, other resinous materials may be included in my emulsions, e. g., melamine-formaldehyde resins, urea-formaldehyde resins, cellulose esters and ethers, phenolic resins, alkyd resins, ester gum, natural and synthetic rubber, rubber hydrochloride, etc.

*The reactive resins and their preparation*

Reactive resins suitable for polymerization with reactive materials containing the $CH_2=C<$ group in accordance with the teachings of my invention are those which contain a plurality of alpha, beta-enal groups of resins. The simplest members of this group are those produced by the esterification of an alpha, beta-unsaturated organic acid with a polyhydric alcohol.

The preferred polyhydric alcohols are those which contain only primary hydroxyl groups since the presence of secondary hydroxyl groups may make it difficult to obtain rapid esterification. The glycols are generally preferable. If colorless resins be desired, it is preferable to use glycols which do not have any oxygen bridges in their structure since the presence of oxygen linkage may lead to the formation of color bodies during the preparation of the resin. By the use of glycols which do not contain oxygen bridges clear, colorless resins may be produced. On the other hand, oxygen bridges may be desirable if the resin is to be used in coatings as they cause films to dry faster.

The particular choice of glycol or other polyhydric alcohol used in preparing the resin is governed mainly by the physical properties desired of the intermediate and final polymerization products and films, especially hardness, distensibility, refractive index, adhesion, compatibility relationships, etc., including also solvent, water, alkali, soap, acid or chemical resistance in general.

The alpha, beta-unsaturated organic acids which I prefer to use in preparing the reactive resins include maleic, fumaric, itaconic and citraconic, although other similar acids could be substituted such as mesaconic acid, aconitic acid and halogenated maleic acids such as chlormaleic acid and any of the foregoing could be substituted in part with acrylic, beta benzoylacrylic, methacrylic, $\Delta^1$-cyclohexene carboxylic, cinnamic, and crotonic acids. Obviously various mixtures of any of these acids can be used where expedient.

The reactive resins may be modified with other substances which are used in alkyd resins, i. e., monohydric alcohols, monobasic acids or dibasic acids, e. g., phthalic acid, sebacic acid, etc. which do not contain groups polymerizably reactive with respect to organic substances containing $CH_2=C<$ groups. These modifying agents are usually used as diluents or plasticizers.

The reactive resins may be prepared from polyhydric alcohols other than the glycols or from mixtures including a glycol and a higher polyhydric alcohol. Examples of these are glycerol, pentaerythritol, etc. Polyhydric alcohols containing more than two hydroxyl groups react very readily with the alpha, beta-unsaturated organic acids. Consequently it may be preferable to use some monohydric alcohol in conjunction with the alcohols which contain more than two hydroxyl groups or else some monobasic acid may be used.

It is also possible to introduce initially into the resin structure a certain number of groupings of the type $CH_2=C<$ through the use of unsaturated alkyl compounds. One way of accomplishing this, for example, is by direct esterification of an unsaturated alcohol containing $CH_2=C<$. Examples of such alcohols are allyl alcohol and methallyl alcohol.

While the reactive resins may be modified in the same general manner as other alkyd resins, it is preferable to have at least 20% polyhydric alcohol in the reactive mixture and at least 25% polybasic acid in said reactive mixture. If a monohydric alcohol or a dibasic acid which does not contain polymerizably active groups with respect to organic substances containing $CH_2=C<$ groups be used, the proportion of such substances will depend on the properties required of the polymerized reactive material-reactive resin mixture. By the use of a relatively large proportion of a polymerizably active dibasic acid, e. g., maleic, in the reactive resin, a hard, tough polymer is produced upon subsequent reaction of said reactive resin with a reactive material containing the $CH_2=C<$ group. On the other hand if the reactive resin is obtained from a relatively small proportion of polymerizably active dibasic acid and a relatively large proportion of acids which do not contain groups polymerizably active with respect to organic substances containing $CH_2=C<$ groups, a softer and more rubbery resin results upon polymerization with a reactive material. The same effect may be produced by the introduction of other inactive ingredients. By varying the ingredients and the proportions of the ingredients, resins may be obtained having properties desirable for almost any particular use.

If it be desirable to introduce lower alkyl groups into the resin, this may be done by using maleic esters of monohydric alcohols, e. g., ethyl maleate. The alkyl ester will then be united with the resin by polymerization. This could not be accomplished with the saturated type of alkyd, e. g., phthalic acid esters of polyhydric alcohols.

Resins which contain a plurality of alpha, beta enal groups are sensitive to light, heat and polymerizing catalysts. Since oxygen tends to cause these resins to polymerize, it is desirable that the resins should be made in the absence of this substance, especially when colorless resins are required. The exclusion of oxygen and polymerizing catalysts is desirable during the preparation of the resin and the presence of dissolved oxygen in the original reactants is also preferably avoided. Moreover, dust and extraneous particles that reagents may pick up usually should be removed, especially if colorless resins are desired. One manner in which the dissolved gases and other extraneous impurities may be removed is through the distillation of the ingredients into the reaction chamber in the absence of air.

In order to keep oxygen from contact with the reactants, an inert gas such as carbon dioxide or nitrogen may be introduced into the reaction chamber. This may be done either by merely passing the gas over the surface or by bubbling the gas through the liquid reactants. In the latter instance it may be made to perform the added function of agitating the mixture thus eliminating the necessity for mechanical agitation. The inert gas will also carry away at least part of the water formed and toward the end of the reaction it can be used to carry away the reactants still remaining unreacted. Upon separation of the water vapor the used carbon dioxide or other inert gas would be particularly suitable for making high grade colorless resins since any residual reactive impurities such as oxygen would have been removed in its passage through the first batch of resin reactants.

The effect of light is not so important if the reactants are purified and the reaction carried on in an inert atmosphere as outlined above. However, as an added precaution the esterification may be conducted in the dark. It is also advisable to avoid local overheating and discoloration is minimized if the reaction is conducted below a temperature of about 200° C. To avoid overheating it is advisable to raise the temperature slowly at the beginning, inasmuch as the reaction between the acid or anhydride and the alcohol is exothermic.

The preparation of the reactive resins is illustrated in the following examples, the reactants being given in parts by weight:

*Preparation of resin A*

|   | Parts |
|---|---|
| 1,3-butylene glycol | 180 |
| Maleic anhydride | 196 |

These substances are heated together in a suitable reaction vessel preferably under an atmosphere of carbon dioxide or other inert gas. The samples were withdrawn at intervals and acid number determinations were made with the following results:

| Time heating, hours | Temp., ° C. | Acid value |
|---|---|---|
| 18 | 145 | 127 |
| 21 | 155 | 101 |
| 25 | 168 | 71 |
| 29 | 170 | 55 |
| 31 | 170 | 42 |

The final product is a viscous yellow resinous material.

*Preparation of resin B*

|   | Parts |
|---|---|
| Fumaric acid | 58 |
| Sebacic acid | 303 |
| Ethylene glycol | 124 |

These substances are heated at about 170° C. for about 21 hours thereby producing a resin having an acid number of about 50. This resin appeared to be waxy at room temperature but resinous at around 60°-70° C. The resin may be recrystallized from ethanol.

*Preparation of resin C*

|   | Parts |
|---|---|
| Fumaric acid | 116 |
| Hexaethylene glycol | 288 |

These substances are heated under an inert atmosphere at a temperature of 175-180° C. for 4 hours or more thereby yielding a product having an acid number of about 17.

*Preparation of resin D*

98 parts of freshly distilled maleic anhydride were reacted with about 10% in excess of equimolecular proportions of freshly distilled ethylene glycol (68 parts) at about 170-175° C. An excess of ethylene glycol is preferred because of its high volatility. The mixture is continuously agitated and carbon dioxide is introduced into the reaction chamber during the reaction, thereby blanketing the surface of the reactants. After eight to twelve hours a clear, water-white resin is produced with an acid number of 35-50.

*Preparation of resin E*

|   | Parts by weight |
|---|---|
| Hexaethylene glycol | 5,495 |
| Maleic anhydride | 1,936 |

These molecular equivalent proportions are reacted in a partially closed container adapted to permit the free escape of the water of esterification. The temperature was taken to 210° C. in thirty-five minutes and was held at between 210° C. and 218° C. for an additional period of about ninety-three minutes and the reaction was then discontinued.

The product which is obtained is a light amber-colored liquid having a viscosity of about 46.3 of poises at 25° C., a refractive index of about 1.4822 at 25° C. and an acid number of about 45.3.

*Preparation of reactive resin azeotropically*

Since the viscosity of the resin frequently becomes quite high if the esterification is carried to a low acid number, it may be desirable to produce the resin under azeotropic conditions. Accordingly, the esterification is conducted in an organic solvent which dissolves the reactants as well as the resultant resin and which is preferably substantially insoluble in water. Examples of these are: benzene, toluene, xylene, chloroform, carbon tetrachloride, ethylene dichloride, propylene dichloride, ethylene and propylene trichlorides, butylene dichloride and trichloride and also higher boiling solvents such as cresol and methyl cyclohexanone, although some of these may tend to darken the resin. The mixture is refluxed in such a manner as to separate the water formed by the esterification. Much lower temperatures are used than are used under the conditions outlined in Examples 10-11. Suitable temperatures range between 90-145° C., for example, for the lower boiling members of the group of solvents set forth above. Obviously this will vary with different solvents and with different concentrations of solvent. The range of preferred concentrations for the inert solvent is from about 25% to about 50%. An esterification catalyst is usually necessary because a comparatively low temperature is employed. Examples of these are thymol sulfonic acid, d-camphor sulfonic acid, and p-toluene sulfonic acid. Obviously other known esterification catalysts could be used. A resin having any particular acid number, if made azeotropically, will usually have a lower viscosity than one of the corresponding acid number not made azeotropically.

*Preparation of resin F*

98 parts by weight of maleic anhydride (vacuum distilled), 106 parts by weight of diethylene glycol (vacuum distilled), about 175 parts ethylene dichloride and about 3 parts of d-camphor sulfonic acid are mixed in a reaction chamber and heated under reflux. The heating was conducted in an oil bath maintained at 130°-145° C. for nine hours. The distillation temperature began at about 90° C. but gradually rises during the heating. The apparatus is so arranged that the water will be separated from the reflux. A light yellow resin with an acid number of about 19.8 is produced after driving off the volatile ingredients including the ethylene dichloride.

The resins prepared in the manner illustrated above are merely exemplary of the reactive resins which I contemplate using for reaction with a reactive material containing the $CH_2=C<$ group in the practice of my invention. Other resins of the same type may be prepared in a similar manner.

Among these resins are the following which may be used in place of those mentioned above: diethylene glycol maleate, alpha propylene glycol maleate, polyethylene glycol maleates (e. g., hexaethylene glycol maleate, heptaethylene glycol maleate, octaethylene glycol maleate, dodecaethylene glycol maleate, etc.), polymethylene glycol maleates (e. g., decamethylene glycol maleate), octadecandiol maleate, the maleic esters: of 2,2-dimethyl propanediol-1,3, of 1,3, butanediol, of 1,2 propanediol and 2-ethyl, 2-butyl butanediol-1,3, glycerol maleate undecylenate, triethylene glycol chlormaleate, triethylene glycol terpene maleate (derived from the interaction of ½ mol of terpene and 1 mol of maleic in the presence of excess of terpene), ethylene glycol fumarate, diethylene glycol fumarate and other polyesters of fumaric acid and other glycols.

The unsaturated alkyd resins preferably have an acid number between about 35 and about 65 although resins having an acid number below 35 as well as up to about 100 may also be employed. Such resins have a low acid number.

The resins should be so formulated that the carboxyl groups of the acids are reacted with the theoretical molal equivalent of the hydroxyl groups of the alcohols. In this connection it is to be noted that the hydroxyl groups of modifying alcohols as well as the carboxyl groups of modifying acids should be included with the hydroxyl groups and carboxyl groups of the principal reactants, the polyhydric alcohol and the alpha, beta-unsaturated polycarboxylic acid, respectively.

My emulsions may be used in coating compositions alone or in admixture with pigments, fillers and other film-forming agents. They may also be used in impregnating fibrous materials.

My polymer produced by polymerizing the reactive mixtures in emulsion are useful in compression molding, injection molding, etc. They may also be used in those applications where the polymer is applied as a hot melt.

Obviously, many other reactants and modifications may be used in the processes outlined in this specification without departing from the spirit and scope of the invention as defined in the claims.

I claim:

1. A process which comprises emulsifying a homogeneous reactive mixture including a material having a single $CH_2=C<$ group and a polymerizably reactive unsaturated alkyd resin selected from the group consisting of polyesters of alpha, beta unsaturated dicarboxylic acids and polyethylene glycols having from six to eight ethylene groups, and the glycol polyesters of alpha, beta unsaturated dicarboxylic acids modified with a long chain saturated polycarboxylic acid containing at least four carbon atoms between the carboxyl groups and which resin contains a plurality of polymerizably reactive alpha, beta-enal groups and said resin being an emulsifier for said mixture in water without the addition of any other substance which acts as an emulsifier, polymerizing said resin while agitating said emulsion thereby forming a resinous product in the form of small particles.

2. A process as defined in claim 1 wherein the material containing a single $CH_2=C<$ group is a vinyl hydrocarbon.

3. A process as in claim 1 wherein the material containing a single $CH_2=C<$ group is styrene.

4. A process as in claim 1 wherein the material containing a single $CH_2=C<$ group is styrene and wherein the ratio of the unsaturated alkyd resin to said styrene is no greater than about 1:20.

EDWARD L. KROPA.

(References on following page)

REFERENCES CITED

The following references are of record in the file of this patent:

UNITED STATES PATENTS

| Number | Name | Date |
|---|---|---|
| 1,967,220 | Barrett et al. | July 24, 1934 |
| 2,089,444 | Staudinger et al. | Aug. 10, 1937 |
| 2,166,542 | Bradley | July 18, 1939 |
| 2,182,316 | Hopff et al. | Dec. 5, 1939 |
| 2,195,362 | Ellis | Mar. 26, 1940 |
| 2,255,313 | Ellis | Sept. 9, 1941 |
| 2,279,436 | Berg | Apr. 14, 1942 |

FOREIGN PATENTS

| Number | Country | Date |
|---|---|---|
| 497,175 | Great Britain | Dec. 14, 1938 |

OTHER REFERENCES

Kropa et al., Ind. & Eng. Chem., vol. 31, p. 1512-1516, Dec. 1939.

Certificate of Correction

Patent No. 2,443,735.                                                                                       June 22, 1948.

EDWARD L. KROPA

It is hereby certified that errors appear in the printed specification of the above numbered patent requiring correction as follows:

Column 1, line 42, for "wihch" read *which*; column 6, line 4, for "flexile" read *flexible*; column 7, line 39, for "molymeriza-" read *polymeriza-*;

and that the said Letters Patent should be read with these corrections therein that the same may conform to the record of the case in the Patent Office.

Signed and sealed this 8th day of February, A. D. 1949.

[SEAL]

THOMAS F. MURPHY,
*Assistant Commissioner of Patents.*

REFERENCES CITED

The following references are of record in the file of this patent:

UNITED STATES PATENTS

| Number | Name | Date |
|---|---|---|
| 1,967,220 | Barrett et al. | July 24, 1934 |
| 2,089,444 | Staudinger et al. | Aug. 10, 1937 |
| 2,166,542 | Bradley | July 18, 1939 |
| 2,182,316 | Hopff et al. | Dec. 5, 1939 |
| 2,195,362 | Ellis | Mar. 26, 1940 |
| 2,255,313 | Ellis | Sept. 9, 1941 |
| 2,279,436 | Berg | Apr. 14, 1942 |

FOREIGN PATENTS

| Number | Country | Date |
|---|---|---|
| 497,175 | Great Britain | Dec. 14, 1938 |

OTHER REFERENCES

Kropa et al., Ind. & Eng. Chem., vol. 31, p. 1512-1516, Dec. 1939.

Certificate of Correction

Patent No. 2,443,735.   June 22, 1948.

EDWARD L. KROPA

It is hereby certified that errors appear in the printed specification of the above numbered patent requiring correction as follows:

Column 1, line 42, for "wihch" read *which*; column 6, line 4, for "flexile" read *flexible*; column 7, line 39, for "molymeriza-" read *polymeriza-*;

and that the said Letters Patent should be read with these corrections therein that the same may conform to the record of the case in the Patent Office.

Signed and sealed this 8th day of February, A. D. 1949.

[SEAL]

THOMAS F. MURPHY,
*Assistant Commissioner of Patents.*